(12) United States Patent
Igari (10) Patent No.: US 11,312,367 B2
(45) Date of Patent: Apr. 26, 2022

(54) CONTROLLER AND CONTROL METHOD

(71) Applicant: Robert Bosch GmbH, Stuttgart (DE)

(72) Inventor: Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 150 days.

(21) Appl. No.: 16/849,194

(22) Filed: Apr. 15, 2020

(65) Prior Publication Data

US 2020/0331460 A1 Oct. 22, 2020

(30) Foreign Application Priority Data

Apr. 22, 2019 (JP) .............................. JP2019-080594

(51) Int. Cl.
| | |
|---|---|
| *B60W 30/04* | (2006.01) |
| *B60W 10/04* | (2006.01) |
| *B60W 10/184* | (2012.01) |
| *B60W 30/18* | (2012.01) |

(52) U.S. Cl.
CPC ............ *B60W 30/04* (2013.01); *B60W 10/04* (2013.01); *B60W 10/184* (2013.01); *B60W 30/18145* (2013.01); *B60W 2030/043* (2013.01); *B60W 2300/36* (2013.01); *B60W 2520/10* (2013.01); *B60W 2520/18* (2013.01); *B60W 2554/802* (2020.02); *B60W 2720/106* (2013.01)

(58) Field of Classification Search
CPC .... B60W 30/04; B60W 10/04; B60W 10/184; B60W 30/18145; B60W 2030/043; B60W 2300/36; B60W 2520/10; B60W 2520/18; B60W 2554/802; B60W 2720/106; B60W 30/146; B60W 30/16; B60W 30/143; B60W 30/14; B60W 30/18

USPC ............................................................ 701/70
See application file for complete search history.

(56) References Cited

U.S. PATENT DOCUMENTS

| | | | | |
|---|---|---|---|---|
| 10,029,683 | B1* | 7/2018 | Ginther | ................ B60W 50/14 |
| 2008/0046159 | A1* | 2/2008 | Baijens | ............. B60K 31/0008 |
| | | | | 701/93 |
| 2014/0358369 | A1* | 12/2014 | Anderfaas | ........... B60W 30/045 |
| | | | | 701/37 |
| 2015/0274019 | A1* | 10/2015 | Matsuda | ................ B60T 8/246 |
| | | | | 701/22 |
| 2015/0364061 | A1* | 12/2015 | Kurosawa | .............. G09B 9/058 |
| | | | | 434/61 |

(Continued)

FOREIGN PATENT DOCUMENTS

| | | | | |
|---|---|---|---|---|
| DE | 102013200044 A1 * | 7/2014 | | ................ B60T 7/22 |
| DE | 112015003610 T5 | 5/2017 | | |

(Continued)

*Primary Examiner* — Jonathan M Dager
*Assistant Examiner* — Jean W Charleston
(74) *Attorney, Agent, or Firm* — Michael Best & Friedrich LLP (57) ABSTRACT

A controller and a control method capable of appropriately assisting with a rider's operation while suppressing falling of a motorcycle, departure of the motorcycle from a lane, a difficulty of the motorcycle in adaptive cruise, and the like is disclosed.
In the controller and the control method according to the present invention, in a control mode to make the motorcycle perform autonomous cruise acceleration operation, automatic acceleration that is acceleration generated to the motorcycle by the autonomous cruise acceleration operation is controlled in accordance with a lean angle of the motorcycle.

20 Claims, 3 Drawing Sheets

(56) References Cited

U.S. PATENT DOCUMENTS

2017/0327109 A1* 11/2017 Watanabe ............. B60W 30/02
2019/0271543 A1* 9/2019 Serita ...................... B60L 15/10
2021/0221368 A1* 7/2021 Lavi ....................... G06V 10/25

FOREIGN PATENT DOCUMENTS

| JP | 2009116882 | | 5/2009 |
| WO | 2018197965 | A1 | 11/2018 |
| WO | 2019020904 | A1 | 1/2019 |

* cited by examiner

CONTROLLER AND CONTROL METHOD

BACKGROUND OF THE INVENTION

The present disclosure relates to a controller and a control method capable of appropriately assisting with a rider's operation while suppressing falling of a motorcycle, departure of the motorcycle from a lane, a difficulty of the motorcycle in adaptive cruise, and the like.

As a conventional technique related to a motorcycle, a technique of assisting with a rider's operation has been available.

For example, a system is disclosed in JP-A-2009-116882. Based on information detected by a sensor that detects an obstacle present in a travel direction or substantially in the travel direction, the system warns a motorcycle rider that the motorcycle inappropriately approaches the obstacle.

SUMMARY OF THE INVENTION

In order to assist with the rider's operation, use of an autonomous cruise travel mode is considered. The autonomous cruise travel mode is a travel mode in which the motorcycle continues traveling with behavior thereof being at least partially and automatically controlled. In the autonomous cruise travel mode, for example, a distance from the motorcycle to a preceding vehicle is controlled to approximate a distance reference value. Thus, in the autonomous cruise travel mode, the motorcycle is possibly controlled to perform autonomous cruise acceleration operation that is operation to accelerate the motorcycle without relying on the rider's operation. Here, a posture of the motorcycle tends to become unstable when compared to a posture of a four-wheeled vehicle, for example. In addition, a center of gravity of the rider himself/herself is significantly shifted during turning travel. This leads to such a problem that falling of the motorcycle, departure of the motorcycle from a lane, a difficulty of the motorcycle in adaptive cruise, and the like possibly occur due to the acceleration of the motorcycle by the autonomous cruise acceleration operation.

The present invention has been made with the above-described problem as the background and therefore obtains a controller and a control method capable of appropriately assisting with a rider's operation while suppressing falling of a motorcycle, departure of the motorcycle from a lane, a difficulty of the motorcycle in adaptive cruise, and the like.

A controller according to the present invention is a controller that controls behavior of a motorcycle, and includes: an acquisition section that acquires a lean angle of the motorcycle; and an execution section that initiates a control mode to make the motorcycle perform autonomous cruise acceleration operation. In the control mode, automatic acceleration that is acceleration generated to the motorcycle by the autonomous cruise acceleration operation is controlled in accordance with the lean angle.

A control method according to the present invention is a control method for controlling behavior of a motorcycle, and includes: an execution step of initiating a control mode to make the motorcycle perform autonomous cruise acceleration operation; and an acquisition step of acquiring a lean angle of the motorcycle. In the control mode, automatic acceleration that is acceleration generated to the motorcycle by the autonomous cruise acceleration operation is controlled in accordance with the lean angle.

In the controller and the control method according to the present invention, in the control mode to make the motorcycle perform the autonomous cruise acceleration operation, the automatic acceleration that is the acceleration generated to the motorcycle by the autonomous cruise acceleration operation is controlled in accordance with the lean angle of the motorcycle. In this way, it is possible to appropriately control the automatic acceleration in accordance with the posture of the motorcycle. Thus, it is possible to appropriately assist with the rider's operation while suppressing the falling of the motorcycle, the departure of the motorcycle from the lane, the difficulty of the motorcycle in the adaptive cruise, and the like.

DETAILED DESCRIPTION

A description will hereinafter be made on a controller and a control method according to the present invention with reference to the drawings. A description will hereinafter be made on a case where a motorcycle is a two-wheeled motor vehicle. However, the motorcycle may be another type of the motorcycle such as a three-wheeled motor vehicle. A description will also be made on a case where a behavior control system drives a rear wheel. However, the behavior control system may drive a front wheel or may drive both of the wheels.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

<Configuration of Behavior Control System>

Figure 1:
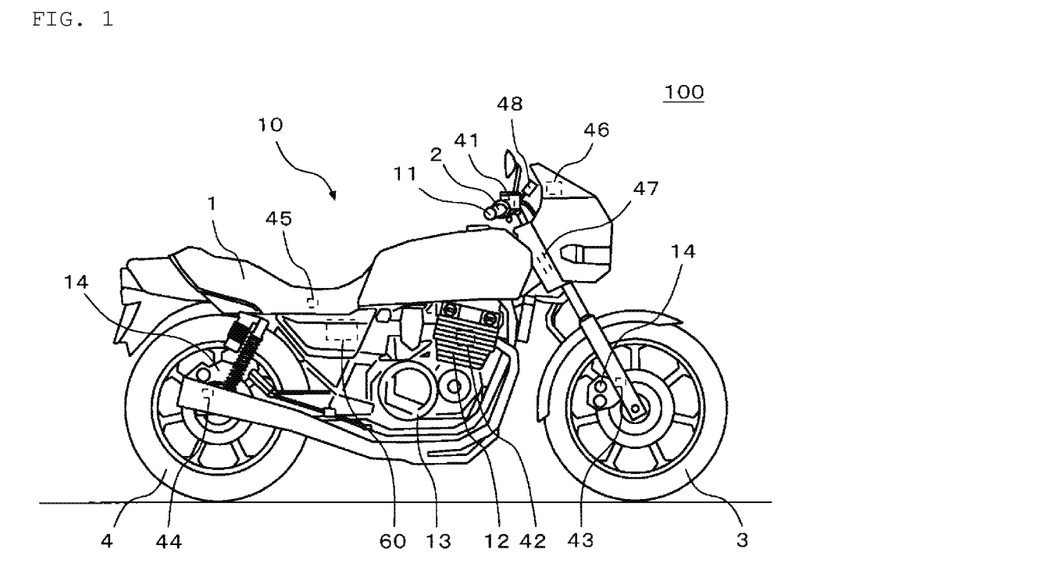
FIG. 1 is a schematic view of an exemplary outline configuration of a motorcycle to which a behavior control system according to an embodiment of the present invention is mounted.
Figure 2:
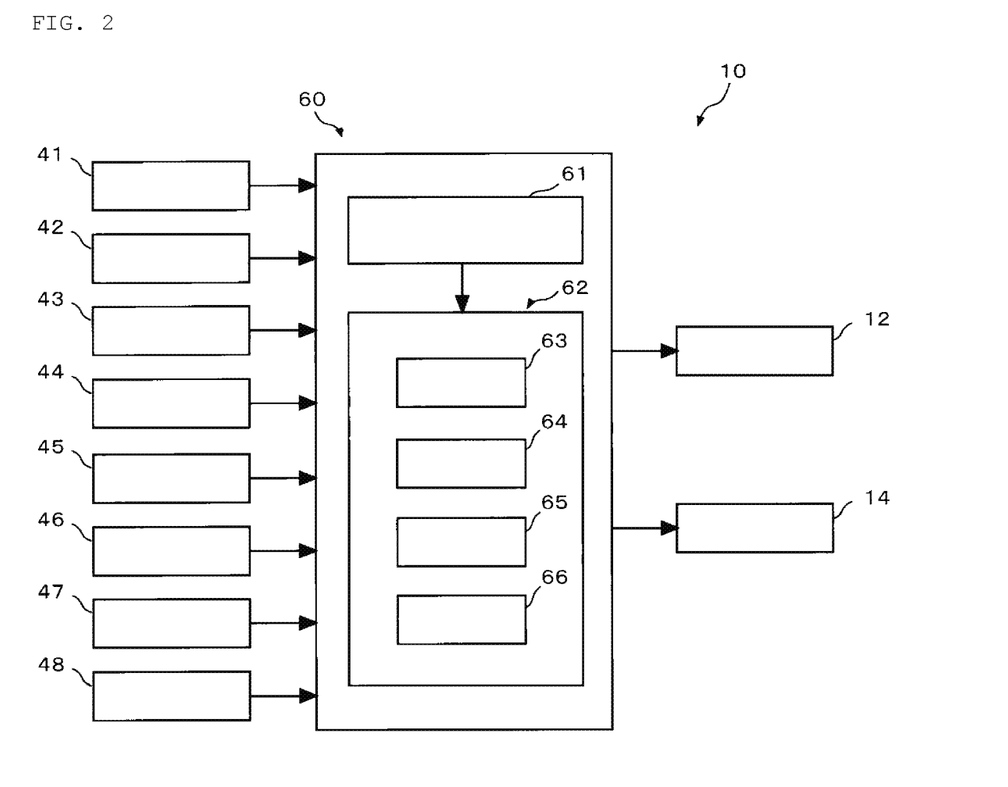
FIG. 2 is a block diagram of an exemplary functional configuration of a controller according to the embodiment of the present invention.
Figure 3:
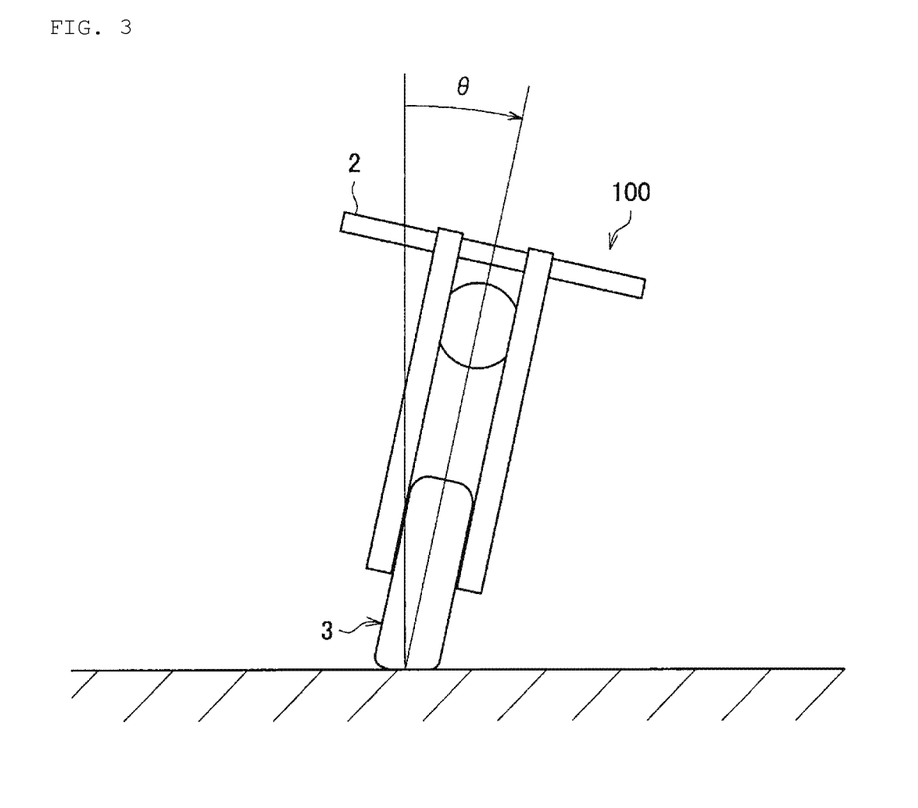
FIG. 3 is a view for illustrating a lean angle.

A description will be made on a configuration of a behavior control system 10 according to an embodiment of the present invention. FIG. 1 is a schematic view of an exemplary outline configuration of a motorcycle 100 to which the behavior control system 10 according to the embodiment of the present invention is mounted. FIG. 2 is a block diagram of an exemplary functional configuration of a controller 60 according to the embodiment of the present invention. FIG. 3 is a view for illustrating a lean angle.

As illustrated in FIG. 1, the behavior control system 10 is mounted to the motorcycle 100. The motorcycle 100 includes: a trunk 1; a handlebar 2 that is held by the trunk 1 in a freely turnable manner; a front wheel 3 that is held by the trunk 1 in the freely turnable manner with the handlebar 2; and a rear wheel 4 that is held by the trunk 1 in a freely rotatable manner.

For example, the behavior control system 10 includes: an operation section 11; a drive source 12 that at least drives in an interlocking manner with the operation section 11; a transmission mechanism 13 that transmits drive power generated by the drive source 12 to the rear wheel 4; and brake mechanisms 14 that brake wheels (the front wheel 3 and the rear wheel 4). The operation section 11 may be a throttle grip provided to the handlebar 2 of the motorcycle 100, or may be an accelerator pedal provided to the trunk 1 of the motorcycle 100, for example. The drive source 12 may be an engine or another mechanism such as a motor, for example. As the brake mechanism 14, the brake mechanism 14 that brakes the front wheel 3 may only be provided, the brake mechanism 14 that brakes the rear wheel 4 may only be provided, or the brake mechanisms 14 that brake both of the front wheel 3 and the rear wheel 4 may be provided.

As illustrated in FIG. 1 and FIG. 2, the behavior control system 10 includes an operation amount sensor 41, a drive amount sensor 42, a front-wheel rotational frequency sensor 43, a rear-wheel rotational frequency sensor 44, a lean angle sensor 45, a surrounding environment sensor 46, a steering angle sensor 47, and an input device 48, for example. Each of the sensors and the input device 48 are communicable with the controller 60. The controller 60 may be provided as a single unit or may be divided into plural units. In addition, the controller 60 may partially or entirely be constructed of a microcomputer, a microprocessor unit, or the like, may be constructed of a member in which firmware or the like can be updated, or may be a program module or the like that is executed by a command from a CPU or the like, for example.

The operation amount sensor 41 detects a displacement amount of the operation section 11, and outputs a detection result. The displacement amount may be detected as a rotation angle, or may be detected as a stroke. The operation amount sensor 41 may detect another physical quantity that can substantially be converted to the displacement amount of the operation section 11.

The drive amount sensor 42 detects a drive amount generated in the motorcycle 100, and outputs a detection result. The drive amount may be detected as a rotational frequency of the drive source 12, or may be detected as torque that is transmitted from the drive source 12 to the rear wheel 4 via the transmission mechanism 13. The drive amount sensor 42 may detect another physical quantity that can substantially be converted to the drive amount generated in the motorcycle 100.

The front-wheel rotational frequency sensor 43 detects a rotational frequency of the front wheel 3, and outputs a detection result. The front-wheel rotational frequency sensor 43 may detect another physical quantity that can substantially be converted to the rotational frequency of the front wheel 3. The rear-wheel rotational frequency sensor 44 detects a rotational frequency of the rear wheel 4, and outputs a detection result. The rear-wheel rotational frequency sensor 44 may detect another physical quantity that can substantially be converted to the rotational frequency of the rear wheel 4. The front-wheel rotational frequency sensor 43 and the rear-wheel rotational frequency sensor 44 are respectively provided to the front wheel 3 and the rear wheel 4.

The lean angle sensor 45 detects the lean angle of the motorcycle 100 and an angular velocity of the lean angle thereof, and outputs a detection result. For example, the lean angle corresponds to a tilt angle θ of the motorcycle 100 in a rolling direction with respect to an upper vertical direction illustrated in FIG. 3. Note that the motorcycle 100 is tilted in the rolling direction with respect to the upper vertical direction during turning travel. More specifically, an inertial measurement unit (IMU) that includes a three-axis gyroscope sensor and a three-directional acceleration sensor is used as the lean angle sensor 45. The lean angle sensor 45 may detect another physical quantity that can substantially be converted to the lean angle of the motorcycle 100 and the angular velocity of the lean angle thereof. The lean angle sensor 45 is provided to the trunk 1.

The surrounding environment sensor 46 detects surrounding environment of the motorcycle 100, and outputs a detection result. For example, as the surrounding environment, the surrounding environment sensor 46 detects a distance from the motorcycle 100 to a preceding vehicle that travels ahead of the motorcycle 100. The surrounding environment sensor 46 may detect another physical quantity that can substantially be converted to the distance to the preceding vehicle. More specifically, a camera that captures an image in front of the motorcycle 100 or a distance measurement sensor that can detect the distance to the preceding vehicle is used as the surrounding environment sensor 46. The surrounding environment sensor 46 is provided to a front portion of the trunk 1.

The steering angle sensor 47 detects a steering angle of the motorcycle 100 and an angular velocity of the steering angle thereof, and outputs a detection result. The steering angle sensor 47 may detect another physical quantity that can substantially be converted to the steering angle of the motorcycle 100 and the angular velocity of the steering angle thereof. The steering angle sensor 47 is provided to the trunk 1.

The input device 48 receives a travel mode selection operation by a rider, and outputs information on the received operation. As the travel mode, the input device 48 at least receives the selection operation to select an autonomous cruise travel mode. The autonomous cruise travel mode is a travel mode in which the motorcycle 100 continues traveling with behavior thereof being at least partially automatically controlled. In the autonomous cruise travel mode, for example, the distance from the motorcycle 100 to the preceding vehicle is controlled to approximate a distance reference value. As the distance from the motorcycle 100 to the preceding vehicle, the distance reference value is set to such a value that the rider's safety can be secured. In the autonomous cruise travel mode, the motorcycle 100 may be controlled such that a body speed thereof approximates a speed reference value. For example, the speed reference value can appropriately be set by the rider. The body speed of the motorcycle 100 can be calculated on the basis of the rotational frequencies of the front wheel 3 and the rear wheel 4. For example, a lever, a button, or a touchscreen can be used as the input device 48. The input device 48 is provided to the handlebar 2, for example.

The controller 60 controls the behavior of the motorcycle 100. The controller 60 includes an acquisition section 61 and an execution section 62, for example. The acquisition section 61 acquires the information that is output from each of the sensors and the input device 48, and outputs the acquired information to the execution section 62. The execution section 62 includes a control section 63, an acceleration request determination section 64, a change rate determination section 65, and a lean angle determination section 66, for example. Each of the determination sections executes determination processing by using the information that is output from each of the sensors. When the rider selects the autonomous cruise travel mode, the execution section 62 initiates a control mode to make the motorcycle 100 perform autonomous cruise acceleration operation in accordance with a determination result by the acceleration request determination section 64. In the control mode, the control section 63 outputs a command that governs output of the drive source 12 in accordance with the determination result by each of the determination sections, so as to control automatic acceleration that is the acceleration of the motorcycle 100 generated by the autonomous cruise acceleration operation. In addition, for example, in a situation where the autonomous cruise acceleration operation is performed on a downhill, the control section 63 may control the automatic acceleration by outputting a command to reduce a braking force applied to each of the wheels (the front wheel 3 and the rear wheel 4) by the brake mechanism 14 of the motorcycle 100.

More specifically, in the control mode, the control section 63 controls the automatic acceleration in accordance with the lean angle of the motorcycle 100. Alternatively, in the control mode, the control section 63 may control the automatic acceleration in accordance with a change rate of a state amount relevant to a posture of the motorcycle 100 during the turning travel. The control for the automatic acceleration includes control to permit or prohibit the autonomous cruise acceleration operation in addition to the control for the automatic acceleration generated to the motorcycle 100 during the autonomous cruise acceleration operation.

The controller 60 includes a storage element, and the information such as the reference value used in each of the processing executed by the controller 60 may be stored in the storage element in advance.

In the autonomous cruise travel mode, autonomous cruise deceleration operation is controlled by another controller that is a separate component from the controller 60 or is integrated with the controller 60, for example. The autonomous cruise deceleration operation is operation to decelerate the motorcycle 100 without relying on the rider's operation. The control for automatic deceleration that is deceleration generated to the motorcycle 100 during the autonomous cruise deceleration operation may be executed when another controller controls the braking force applied to each of the wheels (the front wheel 3 and the rear wheel 4) by the brake mechanism 14 of the motorcycle 100, the output of the drive source 12, or the like, for example.

<Operation of Behavior Control System>

Figure 4:
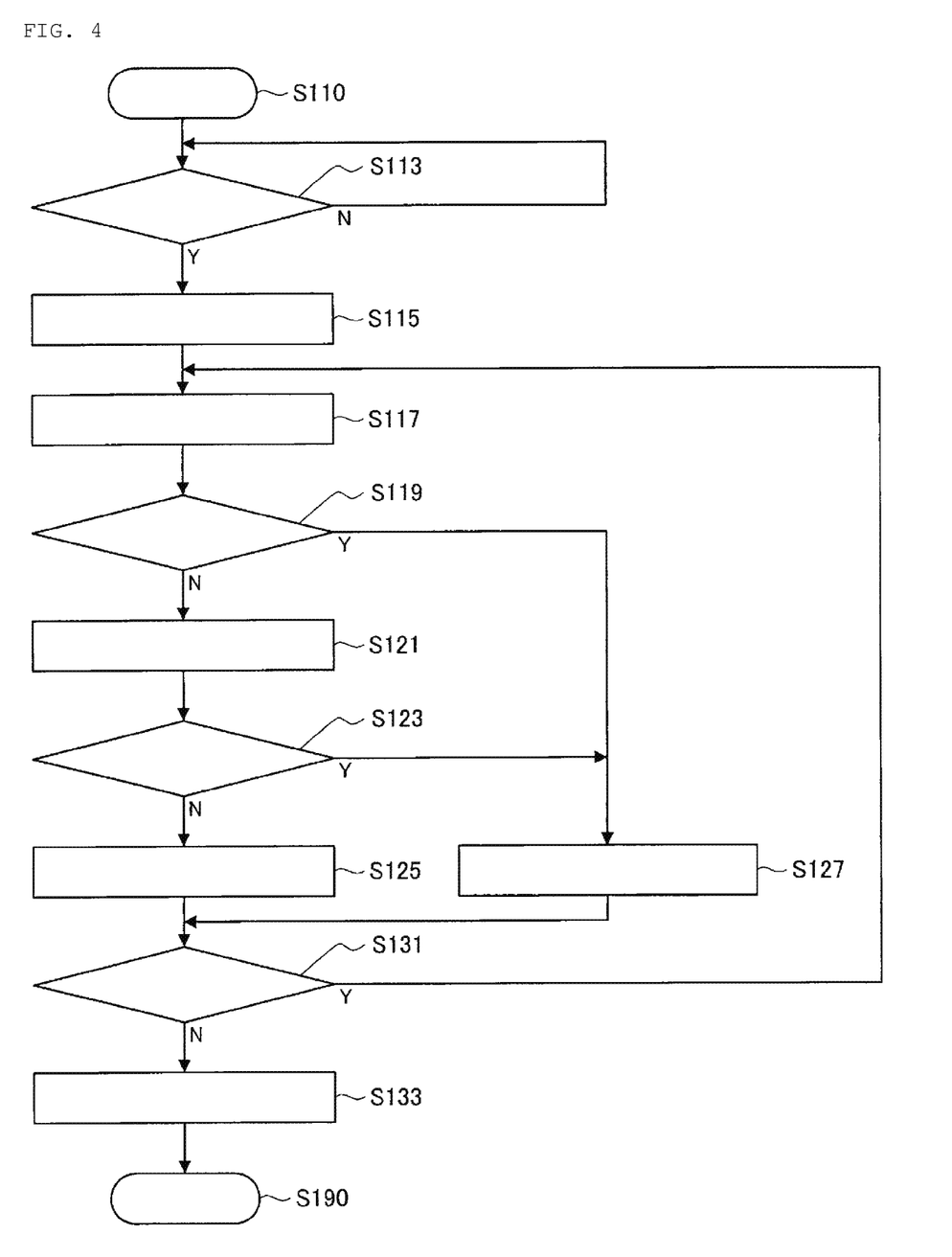
FIG. 4 is a flowchart of an exemplary processing procedure that is executed by the controller according to the embodiment of the present invention.

A description will be made on operation of the behavior control system 10 according to the embodiment of the present invention. FIG. 4 is a flowchart of an exemplary processing procedure that is executed by the controller 60 according to the embodiment of the present invention. A control flow illustrated in FIG. 4 is repeated while the autonomous cruise travel mode is selected. Step S110 and step S190 in FIG. 4 respectively correspond to initiation and termination of the control flow. In step S110, the control flow is initiated in a state where the control mode is not initiated.

In step S113, the acceleration request determination section 64 determines whether an acceleration request has been made. If it is determined that an acceleration request has been made (step S113/Y), the processing proceeds to step S115. On the other hand, if it is determined that the acceleration request has not been made (step S113/N), step S113 is repeated. For example, in the case where the distance from the motorcycle 100 to the preceding vehicle exceeds the distance reference value, the acceleration request determination section 64 determines that the acceleration request has been made. In the case where the motorcycle 100 is controlled in the autonomous cruise travel mode such that the body speed thereof approximates the speed reference value and where the body speed of the motorcycle 100 falls below the speed reference value, the acceleration request determination section 64 may determine that the acceleration request has been made.

The above description has been made on the case where the acceleration request determination section 64 compares the distance from the motorcycle 100 to the preceding vehicle with the distance reference value or compares the body speed of the motorcycle 100 with the speed reference value. However, these comparisons may be made by the different controller from the controller 60. In such a case, the other controller outputs information indicative of results of these comparisons or information that directly indicates whether the acceleration request has been made to the controller 60. In this way, the acceleration request determination section 64 can make the determination.

In step S115, the execution section 62 initiates the control mode to make the motorcycle 100 perform the autonomous cruise acceleration operation.

Next, in step S117, the acquisition section 61 acquires the change rate of the state amount relevant to the posture of the motorcycle 100 during the turning travel. The state amount relevant to the posture of the motorcycle 100 during the turning travel includes the lean angle, the angular velocity of the lean angle, the steering angle, or the angular velocity of the steering angle, for example.

Next, in step S119, the change rate determination section 65 determines whether the change rate of the state amount relevant to the posture of the motorcycle 100 during the turning travel exceeds a change rate reference value. If it is determined that the change rate exceeds the change rate reference value (step S119/Y), the processing proceeds to step S127. On the other hand, if it is determined that the change rate does not exceed the change rate reference value (step S119/N), the processing proceeds to step S121. The change rate reference value is set to a value with which it is possible to determine whether the rider has his/her intention to change a course.

In step S121, the acquisition section 61 acquires the lean angle of the motorcycle 100.

Next, in step S123, the lean angle determination section 66 determines whether the lean angle of the motorcycle 100 exceeds a lean angle reference value. If it is determined that the lean angle exceeds the lean angle reference value (step S123/Y), the processing proceeds to step S127. On the other hand, if it is determined that the lean angle does not exceed the lean angle reference value (step S123/N), the processing proceeds to step S125. The lean angle reference value is a value with which it is possible to determine whether a possibility of falling of the motorcycle 100, departure of the motorcycle 100 from a lane, a difficulty of the motorcycle 100 in adaptive cruise, or the like, which is caused by generation of the acceleration of the motorcycle 100, is excessively high, and is set in accordance with a friction coefficient of a travel road surface, a design specification of the motorcycle 100, or the like, for example.

In step S125, the control section 63 permits the autonomous cruise acceleration operation. Once permitting the autonomous cruise acceleration operation, the control section 63 causes the generation of the automatic acceleration that is the acceleration irrespective of the rider's operation, and makes the motorcycle 100 perform the autonomous cruise acceleration operation. For example, the control section 63 causes the generation of the automatic acceleration by making the motorcycle 100 generate the drive power. For example, in a situation where the autonomous cruise acceleration operation is performed on the downhill, the control section 63 may cause the generation of the automatic acceleration by reducing the braking force generated to the motorcycle 100. The braking force includes the braking force applied to each of the wheels (the front wheel 3 and the rear wheel 4) by the brake mechanism 14, the braking force generated by engine brake, and the like.

For example, the control section 63 controls the drive power to be generated to the motorcycle 100 by controlling the output of the drive source 12. More specifically, the control section 63 calculates reference target acceleration that is a reference value of a target automatic acceleration value. For example, as a difference between the distance from the motorcycle 100 to the preceding vehicle and the distance reference value is increased (in other words, as the motorcycle 100 departs from the preceding vehicle), the control section 63 calculates a larger value as the reference target acceleration. However, the control section 63 may calculate a constant value as the reference target acceleration irrespective of the difference between the distance from the motorcycle 100 to the preceding vehicle and the distance reference value. Then, the control section 63 determines target acceleration on the basis of the calculated reference target acceleration. For example, the control section 63 determines a value that is acquired by multiplying the reference target acceleration by a coefficient as the target acceleration. Then, on the basis of the target acceleration, the control section 63 determines a target rotational frequency that is a target value of the rotational frequency of the drive source 12. Next, the control section 63 controls the rotational frequency of the drive source 12 such that the rotational frequency matches the target rotational frequency. In this way, the automatic acceleration is controlled to match the target acceleration.

In the case where the motorcycle 100 is controlled in the autonomous cruise travel mode such that the body speed thereof approximates the speed reference value, the control section 63 calculates the larger value as the reference target acceleration as a difference between the body speed of the motorcycle 100 and the speed reference value is increased, for example. However, the control section 63 may calculate the constant value as the reference target acceleration irrespective of the difference between the body speed of the motorcycle 100 and the speed reference value.

The above description has been made on the case where the control section 63 calculates the reference target acceleration. However, the different controller from the controller 60 may calculate the reference target acceleration. In such a case, the other controller outputs information on the reference target acceleration to the controller 60. In this way, the control section 63 can control the automatic acceleration.

For example, in the case where the lean angle is large, the control section 63 makes the motorcycle 100 perform the autonomous cruise acceleration operation in which the automatic acceleration is lower than the automatic acceleration in the autonomous cruise acceleration operation that is performed when the lean angle is small. More specifically, the control section 63 determines, as the target acceleration, the value that is acquired by multiplying the reference target acceleration by the smaller coefficient as the lean angle is increased. In this way, the control section 63 controls the automatic acceleration.

In addition, for example, in the case where the change rate of the state amount relevant to the posture of the motorcycle 100 during the turning travel is high, the control section 63 makes the motorcycle 100 perform the autonomous cruise acceleration operation in which the automatic acceleration is lower than the automatic acceleration in the autonomous cruise acceleration operation that is performed when the change rate is low. More specifically, the control section 63 determines, as the target acceleration, the value that is acquired by multiplying the reference target acceleration by the smaller coefficient as the change rate of the state amount relevant to the posture of the motorcycle 100 during the turning travel is increased. In this way, the control section 63 controls the automatic acceleration.

The control section 63 may determine the target acceleration in accordance with both of the lean angle and the change rate of the state amount relevant to the posture of the motorcycle 100 during the turning travel. In such a case, for example, the control section 63 determines, as the target acceleration, the value that is acquired by multiplying the reference target acceleration by both of the coefficient corresponding to the lean angle and the coefficient corresponding to the change rate of the state amount.

In step S127, the control section 63 prohibits the autonomous cruise acceleration operation. When prohibiting the autonomous cruise acceleration operation, the control section 63 brings the motorcycle 100 into a normal state where the acceleration is generated in accordance with the rider's operation. The motorcycle 100 may be controlled in a state where the body speed thereof is maintained at the speed before the prohibition.

Following step S125 or step S127, in step S131, the acceleration request determination section 64 determines whether the acceleration request has been made. If it is determined that the acceleration request has been made (step S131/Y), the processing returns to step S117. On the other hand, if it is determined that the acceleration request has not been made (step S131/N), the processing proceeds to step S133.

As described above, if it is determined in step S131 that the acceleration request has been made (step S131/Y), the control mode continues, and the processing from step S117 to step S131 is repeated. In the case where the control mode continues, the control section 63 appropriately switches between a state where the autonomous cruise acceleration operation is permitted and a state where the autonomous cruise acceleration operation is prohibited in accordance with determination results of the determination processing by the change rate determination section 65 and the lean angle determination section 66 (step S119 and step S123).

In the case where the determination results in step S119 and step S123 are No in the state where the autonomous cruise acceleration operation is permitted, the control section 63 continues the state where the autonomous cruise acceleration operation is permitted. In this case, for example, the control section 63 controls the automatic acceleration generated to the motorcycle 100 during the autonomous cruise acceleration operation in accordance with the lean angle that is acquired during the autonomous cruise acceleration operation. In addition, for example, the control section 63 controls the automatic acceleration generated to the motorcycle 100 during the autonomous cruise acceleration operation in accordance with the change rate of the state amount relevant to the posture of the motorcycle 100 during the turning travel that is acquired during the autonomous cruise acceleration operation.

In the case where at least one of the determination results in step S119 and step S123 is Yes in the state where the autonomous cruise acceleration operation is permitted, the control section 63 cancels the state where the autonomous cruise acceleration operation is permitted, and prohibits the autonomous cruise acceleration operation. For example, in the case where the change rate of the state amount relevant to the posture of the motorcycle 100 during the turning travel that is acquired during the autonomous cruise acceleration operation exceeds the change rate reference value, the control section 63 cancels the state where the autonomous cruise acceleration operation is permitted, and prohibits the autonomous cruise acceleration operation. In addition, for example, in the case where the lean angle that is acquired during the autonomous cruise acceleration operation exceeds the lean angle reference value, the control section 63 cancels the state where the autonomous cruise acceleration operation is permitted, and prohibits the autonomous cruise acceleration operation.

In the case where at least one of the determination results in step S119 and step S123 is Yes in the state where the autonomous cruise acceleration operation is prohibited, the control section 63 continues the state where the autonomous cruise acceleration operation is prohibited.

In the case where the determination results in step S119 and step S123 are No in the state where the autonomous cruise acceleration operation is prohibited, the control section 63 cancels the state where the autonomous cruise acceleration operation is prohibited, and permits the autonomous cruise acceleration operation. For example, in the cases where the determination result in step S119 is No and the lean angle that is acquired during the prohibition of the autonomous cruise acceleration operation falls below the lean angle reference value, the control section 63 cancels the state where the autonomous cruise acceleration operation is prohibited, and permits the autonomous cruise acceleration operation. However, the determination processing in step S119 may be eliminated from the control flow illustrated in FIG. 4. In such a case, in the case where the lean angle that is acquired during the prohibition of the autonomous cruise acceleration operation falls below the lean angle reference value, the control section 63 cancels the state where the autonomous cruise acceleration operation is prohibited, and permits the autonomous cruise acceleration operation.

In step S133, the execution section 62 terminates the control mode.

<Effects of Behavior Control System>

A description will be made on effects of the behavior control system 10 according to the embodiment of the present invention.

In the control mode in which the motorcycle 100 performs the autonomous cruise acceleration operation, the behavior control system 10 controls the automatic acceleration in accordance with the lean angle of the motorcycle 100. In this way, it is possible to appropriately control the automatic acceleration in accordance with the posture of the motorcycle 100. Therefore, it is possible to appropriately assist with the rider's operation while suppressing the falling of the motorcycle 100, the departure of the motorcycle 100 from the lane, the difficulty of the motorcycle 100 in the adaptive cruise, and the like.

Preferably, in the control mode, in the case where the lean angle is large, the behavior control system 10 performs the autonomous cruise acceleration operation in which the automatic acceleration is lower than the automatic acceleration in the autonomous cruise acceleration operation that is performed when the lean angle is small. Here, grounding areas of tires of the motorcycle 100 are reduced as the lean angle is increased. In addition, a friction characteristic in a grounding portion of each of the tires of the motorcycle 100 possibly has such a characteristic that a friction force is less likely to be generated in an advancing direction as the lean angle is increased. Accordingly, the possibility of the falling of the motorcycle 100, which is caused by the generation of the acceleration of the motorcycle 100, tends to be increased as the lean angle is increased. In addition, in the situation where the large lean angle is generated in the motorcycle 100, it is difficult to maintain the posture. Thus, the generation of the high acceleration that is unexpected by the rider possibly leads to the departure of the motorcycle 100 from the lane, the difficulty of the motorcycle 100 in the adaptive cruise, and the like. Therefore, in the case where the lean angle is large, compared to the autonomous cruise acceleration operation that is performed when the lean angle is small, it is possible to effectively suppress the falling of the motorcycle 100, the departure of the motorcycle 100 from the lane, the difficulty of the motorcycle 100 in the adaptive cruise, and the like by performing the autonomous cruise acceleration operation in which the automatic acceleration is low.

Preferably, in the control mode, the behavior control system 10 controls the automatic acceleration generated to the motorcycle 100 during the autonomous cruise acceleration operation in accordance with the lean angle that is acquired during the autonomous cruise acceleration operation. In this way, it is possible to appropriately control the automatic acceleration generated to the motorcycle 100 during the autonomous cruise acceleration operation in accordance with the change in the lean angle over time during the autonomous cruise acceleration operation. For example, it is possible to increase the automatic acceleration in conjunction with a reduction in the lean angle that is caused by performing the autonomous cruise acceleration operation. Therefore, it is possible to further improve the effect of appropriately assisting with the rider's operation while suppressing the falling of the motorcycle 100, the departure of the motorcycle 100 from the lane, the difficulty of the motorcycle 100 in the adaptive cruise, and the like.

Preferably, in the control mode, the behavior control system 10 prohibits the autonomous cruise acceleration operation in the case where the lean angle exceeds the lean angle reference value. In this way, in the case where the possibility of the falling of the motorcycle 100, the departure of the motorcycle 100 from the lane, the difficulty of the motorcycle 100 in the adaptive cruise, or the like, which is caused by the generation of the acceleration of the motorcycle 100, is excessively high, the autonomous cruise acceleration operation can be prohibited. As a result, it is possible to effectively suppress the falling of the motorcycle 100, the departure of the motorcycle 100 from the lane, the difficulty of the motorcycle 100 in the adaptive cruise, and the like.

Preferably, in the control mode, the behavior control system 10 permits the autonomous cruise acceleration operation in the case where the lean angle that is acquired during the prohibition of the autonomous cruise acceleration operation falls below the lean angle reference value. In this way, in the case where the possibility of the falling of the motorcycle 100, the departure of the motorcycle 100 from the lane, the difficulty of the motorcycle 100 in the adaptive cruise, or the like, which is caused by the generation of the acceleration of the motorcycle 100, becomes relatively low even during the prohibition of the autonomous cruise acceleration operation, it is possible to appropriately perform the autonomous cruise acceleration operation. Therefore, it is possible to improve the effect of appropriately assisting with the rider's operation.

Preferably, in the control mode, the behavior control system 10 controls the automatic acceleration in accordance with the change rate of the state amount relevant to the posture of the motorcycle 100 during the turning travel. In this way, it is possible to further appropriately control the automatic acceleration in accordance with the posture of the motorcycle 100. Therefore, it is possible to further improve the effect of appropriately assisting with the rider's operation while suppressing the falling of the motorcycle 100, the departure of the motorcycle 100 from the lane, the difficulty of the motorcycle 100 in the adaptive cruise, and the like.

Preferably, in the control mode, the behavior control system 10 prohibits the autonomous cruise acceleration operation in the case where the change rate of the state amount relevant to the posture of the motorcycle 100 during the turning travel exceeds the change rate reference value. In this way, in the case where it is assumed that the rider has his/her intention to change the course, the autonomous cruise acceleration operation can be prohibited. Thus, it is possible to suppress the generation of the automatic acceleration against the rider's intention. As a result, it is possible to effectively suppress the falling of the motorcycle 100, the departure of the motorcycle 100 from the lane, the difficulty of the motorcycle 100 in the adaptive cruise, and the like.

In the control mode, the control section 63 may prohibit the autonomous cruise acceleration operation in the case where an operation amount of the motorcycle 100 operated by the rider exceeds an operation amount reference value. The rider's operation of the motorcycle 100 includes an accelerator pedal operation, a brake operation, and a clutch operation, for example. The operation amount reference value is set to a value with which it is possible to determine whether the rider has operated the motorcycle 100. Accordingly, in the case where the operation amount exceeds the operation amount reference value, the autonomous cruise acceleration operation is prohibited. In this way, it is possible to suppress the generation of the automatic acceleration against the rider's operation of the motorcycle 100. As a result, it is possible to effectively suppress the falling of the motorcycle 100, the departure of the motorcycle 100 from the lane, the difficulty of the motorcycle 100 in the adaptive cruise, and the like.

In addition, in the control mode, in the case where the change rate of the state amount relevant to the posture of the motorcycle 100 during the turning travel exceeds the change rate reference value, the control section 63 may reduce the operation amount reference value in comparison with the case where the change rate does not exceed the change rate reference value. In this way, in the case where it is assumed that the rider has his/her intention to change the course, a sense to detect the rider's operation of the motorcycle 100 can be improved. Therefore, it is possible to improve reliability of prohibiting the autonomous cruise acceleration operation.

Preferably, in the control mode, in the case where the change rate of the state amount relevant to the posture of the motorcycle 100 during the turning travel is high, the behavior control system 10 performs the autonomous cruise acceleration operation in which the automatic acceleration is lower than the automatic acceleration in the autonomous cruise acceleration operation that is performed when the change rate is low. Here, it is assumed that the possibility of the rider having his/her intention to change the course is higher as the change rate of the state amount is increased. Accordingly, in the case where the change rate of the state amount is high, the autonomous cruise acceleration operation, in which the automatic acceleration is lower than the automatic acceleration in the autonomous cruise acceleration operation that is performed when the change rate is low, is performed. In this way, it is possible to appropriately control the automatic acceleration in accordance with the possibility of the rider having his/her intention to change the course. Thus, it is possible to suppress the falling of the motorcycle 100, the departure of the motorcycle 100 from the lane, the difficulty of the motorcycle 100 in the adaptive cruise, and the like, which is caused by the generation of the automatic acceleration against the rider's intention.

Preferably, in the control mode, the behavior control system 10 controls the automatic acceleration generated to the motorcycle 100 during the autonomous cruise acceleration operation in accordance with the change rate of the state amount relevant to the posture of the motorcycle 100 during the turning travel that is acquired during the autonomous cruise acceleration operation. In this way, it is possible to appropriately control the automatic acceleration generated to the motorcycle 100 during the autonomous cruise acceleration operation in accordance with a change in the change rate of the state amount over time during the autonomous cruise acceleration operation. Therefore, it is possible to effectively suppress the falling of the motorcycle 100, the departure of the motorcycle 100 from the lane, the difficulty of the motorcycle 100 in the adaptive cruise, and the like, which is caused by the generation of the automatic acceleration against the rider's intention.

Preferably, the state amount relevant to the posture of the motorcycle 100 during the turning travel that is used for the control of the automatic acceleration includes the lean angle of the motorcycle 100 or the angular velocity of the lean angle thereof. In this way, it is possible to control the automatic acceleration by using the detection result that is output from the lean angle sensor 45. Thus, other sensors (for example, the steering angle sensor 47) can be eliminated from the configuration of the behavior control system 10. Therefore, the behavior control system 10 can be simplified.

The present invention is not limited to the embodiment that has been described. For example, only a part of the embodiment may be implemented, or parts of the embodiment may be combined. In addition, an order of the steps may be switched, for example.

REFERENCE SIGNS LIST

1: Trunk
2: Handlebar
3: Front wheel
4: Rear wheel
10: Behavior control system
11: Operation section
12: Drive source
13: Transmission mechanism
14: Brake mechanism
41: Operation amount sensor
42: Drive amount sensor
43: Front-wheel rotational frequency sensor
44: Rear-wheel rotational frequency sensor
45: Lean angle sensor
46: Surrounding environment sensor
47: Steering angle sensor
48: Input device
60: Controller
61: Acquisition section
62: Execution section
63: Control section
64: Acceleration request determination section
65: Change rate determination section
66: Lean angle determination section
100: Motorcycle

What is claimed is:

1. A controller (60) that controls behavior of a motorcycle (100), the controller configured to:
   acquire a lean angle of the motorcycle (100); and
   initiate a control mode to make the motorcycle (100) perform autonomous cruise acceleration operation, wherein
   in the control mode, automatic acceleration that is acceleration generated to the motorcycle (100) by the autonomous cruise acceleration operation is controlled so that when the lean angle is large, the automatic acceleration is lower than the automatic acceleration in the autonomous cruise acceleration operation that is performed when the lean angle is small.

2. The controller according to claim 1, wherein
   in the control mode, the automatic acceleration generated to the motorcycle (100) during the autonomous cruise acceleration operation is controlled in accordance with the lean angle that is acquired during the autonomous cruise acceleration operation.

3. The controller according to claim 1, wherein
   in the control mode, in the case when the lean angle exceeds a lean angle reference value, the autonomous cruise acceleration operation is prohibited.

4. The controller according to claim 3, wherein
   in the control mode, in the case when the lean angle that is acquired during prohibition of the autonomous cruise acceleration operation falls below the lean angle reference value, the autonomous cruise acceleration operation is permitted.

5. The controller according to claim 1, wherein
   the controller is configured to acquire a change rate of a state amount relevant to a posture of the motorcycle (100) during turning travel, and
   in the control mode, in the case when the change rate exceeds a change rate reference value, the autonomous cruise acceleration operation is prohibited.

6. The controller according to claim 5, wherein
   the state amount includes the lean angle of the motorcycle (100).

7. The controller according to claim 5, wherein
   the state amount includes an angular velocity of the lean angle of the motorcycle (100).

8. The controller according to claim 1, wherein,
   the controller is configured to acquire a change rate of a state amount relevant to a posture of the motorcycle (100) during turning travel, and
   in the control mode, in the case when the change rate is high, the autonomous cruise acceleration operation, in which the automatic acceleration is lower than the automatic acceleration in the autonomous cruise acceleration operation that is performed when the change rate is low, is performed.

9. The controller according to claim 1, wherein
   in the control mode, the automatic acceleration is controlled by controlling output of a drive source (12) in the motorcycle (100).

10. The controller according to claim 1, wherein
    in the control mode, the automatic acceleration is controlled by controlling a braking force applied to a wheel (3, 4) by a brake mechanism (14) of the motorcycle (100).

11. The controller according to claim 1, wherein
    the controller initiates the control mode in the case when a distance from the motorcycle (100) to a preceding vehicle exceeds a distance reference value.

12. The controller according to claim 1, wherein
    the controller initiates the control mode in the case when a body speed of the motorcycle (100) falls below a speed reference value.

13. A control method for controlling behavior of a motorcycle (100), the control method comprising:
    an execution step (S115) of initiating a control mode to make the motorcycle (100) perform autonomous cruise acceleration operation; and
    an acquisition step (S121) of acquiring a lean angle of the motorcycle (100), wherein
    in the control mode, automatic acceleration that is acceleration generated to the motorcycle (100) by the autonomous cruise acceleration operation is controlled so that when the lean angle is large, the automatic acceleration is lower than the automatic acceleration in the autonomous cruise acceleration operation that is performed when the lean angle is small.

14. The control method according to claim 13, wherein, in the control mode, in the case when the lean angle exceeds a lean angle reference value, the autonomous cruise acceleration operation is prohibited.

15. The control method according to claim 14, wherein, in the control mode, in the case when the lean angle that is acquired during prohibition of the autonomous cruise acceleration operation falls below the lean angle reference value, the autonomous cruise acceleration operation is permitted.

16. The control method according to claim 13, including acquiring a change rate of a state amount relevant to a posture of the motorcycle (100) during turning travel, and
    in the control mode, in the case when the change rate exceeds a change rate reference value, the autonomous cruise acceleration operation is prohibited.

17. The control method according to claim 16, wherein
    the state amount includes the lean angle of the motorcycle (100).

18. The control method according to claim 16, wherein
    the state amount includes an angular velocity of the lean angle of the motorcycle (100).

19. The control method according to claim 13, wherein, in the control mode, the automatic acceleration is controlled by controlling output of a drive source (12) in the motorcycle (100).

20. The control method according to claim 13, wherein, in the control mode, the automatic acceleration is controlled by controlling a braking force applied to a wheel (3, 4) by a brake mechanism (14) of the motorcycle (100).

* * * * *